United States Patent
Mikami et al.

(10) Patent No.: US 9,825,268 B2
(45) Date of Patent: Nov. 21, 2017

(54) SEPARATOR FOR NONAQUEOUS ELECTROLYTE SECONDARY BATTERY, NONAQUEOUS ELECTROLYTE SECONDARY BATTERY UTILIZING SAME, AND MANUFACTURING METHODS OF SAME

(71) Applicant: Panasonic Corporation, Osaka (JP)

(72) Inventors: Masateru Mikami, Osaka (JP); Toshifumi Nagino, Osaka (JP); Takao Kuromiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 511 days.

(21) Appl. No.: 14/382,883

(22) PCT Filed: Jan. 25, 2013

(86) PCT No.: PCT/JP2013/000399
§ 371 (c)(1),
(2) Date: Sep. 4, 2014

(87) PCT Pub. No.: WO2013/132738
PCT Pub. Date: Sep. 12, 2013

(65) Prior Publication Data
US 2015/0072212 A1   Mar. 12, 2015

(30) Foreign Application Priority Data
Mar. 6, 2012  (JP) .................. 2012-048941

(51) Int. Cl.
*H01M 2/16* (2006.01)
*D04H 1/4382* (2012.01)
*D04H 1/728* (2012.01)
*H01M 2/14* (2006.01)
*D04H 3/016* (2012.01)
(Continued)

(52) U.S. Cl.
CPC .......... *H01M 2/162* (2013.01); *D01D 5/0007* (2013.01); *D01D 5/36* (2013.01); *D01F 6/46* (2013.01); *D01F 6/50* (2013.01); *D04H 1/4382* (2013.01); *D04H 1/728* (2013.01); *D04H 3/016* (2013.01); *H01M 2/145* (2013.01); *H01M 2/1686* (2013.01); *D10B 2321/02* (2013.01);
(Continued)

(58) Field of Classification Search
None
See application file for complete search history.

(56) References Cited

U.S. PATENT DOCUMENTS

2011/0177395 A1* 7/2011 Kamisasa ............ D01D 5/0023
429/246

FOREIGN PATENT DOCUMENTS

JP       61-232560 A    10/1986
JP       2004-115980 A   4/2004
(Continued)

OTHER PUBLICATIONS

International Search Report for PCT/JP2013/000399, dated Apr. 16, 2013.

*Primary Examiner* — Alix Eggerding
(74) *Attorney, Agent, or Firm* — RatnerPrestia

(57) ABSTRACT

The separator of a nonaqueous electrolyte secondary battery is characterized by having a composite nanofiber fiber which is a nanosize fiber that contains two or more kinds of aqueous resins whose melting points are different.

8 Claims, 10 Drawing Sheets

(51) Int. Cl.
*D01D 5/00* (2006.01)
*D01D 5/36* (2006.01)
*D01F 6/46* (2006.01)
*D01F 6/50* (2006.01)
*H01M 10/0525* (2010.01)

(52) U.S. Cl.
CPC .... *H01M 10/0525* (2013.01); *Y10T 29/49108* (2015.01)

(56) References Cited

FOREIGN PATENT DOCUMENTS

| | | |
|---|---|---|
| JP | 2010-103050 A | 5/2010 |
| JP | 2011-168935 A | 9/2011 |

\* cited by examiner

SEPARATOR FOR NONAQUEOUS ELECTROLYTE SECONDARY BATTERY, NONAQUEOUS ELECTROLYTE SECONDARY BATTERY UTILIZING SAME, AND MANUFACTURING METHODS OF SAME

CROSS-REFERENCE TO RELATED APPLICATIONS

This application is a U.S. national phase application of PCT International Patent Application No. PCT/JP2013/000399, filed Jan. 25, 2013, claiming the benefit of priority of Japanese Patent Application No. 2012-048941, filed Mar. 6, 2012, all of which are incorporated by reference herein in their entirety.

TECHNICAL FIELD

An aspect of the present invention is one which relates to a separator that is a configuration material of a nonaqueous electrolyte secondary battery such as a lithium ion battery and the like, and a nonaqueous electrolyte secondary battery and the like utilizing the same.

BACKGROUND ART

A lithium ion battery, of which a lithium ion secondary battery is representative, is widely prevalent as a main electric power source of a mobile electronic apparatus (for example, a smartphone, a mobile telephone or a notebook PC). For a lithium ion battery like this, in order to achieve further high density, high capacity and high output of energy, technological development is underway.

As the negative electrode material of the lithium ion battery, a carbon material, a compound or the like which is able to store and release lithium ions is utilized. As the positive electrode material of the lithium ion battery, $LiCoO_2$ or the like is utilized. As the electrolyte liquid of the lithium ion battery, one such that $LiPF_6$ or the like as an electrolyte is dissolved in an organic solvent such as ethylene carbonate or the like is utilized. As the separator of the lithium ion battery, polyethylene (PE) or the like is utilized.

The separator is a member which physically separates the positive electrode and the negative electrode. In a case where the separator is of a fiber type, the diameter of the fiber, which is a configuration member, largely affects movement or retention of the electrolyte liquid. The void rate of the separator becomes small if the diameter of the fiber is large and, since the liquid amount of the electrolyte liquid which is able to be retained becomes little, the ion mobility between the positive and negative electrodes at the time of electric charge/discharge becomes bad. Because of that, development of separators utilizing nanofiber fibers with a diameter of the fiber being narrow has been recently required.

Moreover, for a lithium ion battery which is configured from these materials, in a case where an abnormal electric current flows by a short-circuit and the like, the battery temperature remarkably rises, and there is a possibility that a thermal damage could be given to the apparatus.

Accordingly, in a case where a rise of the temperature by an abnormal electric current occurs, by allowing the electric resistance of the separator to increase, the battery reaction is blocked, and a remarkable rise of the battery temperature is prevented.

In general, called a shutdown characteristic is the function of ensuring safetiness by blocking, in this way, the battery reaction by the increase of the electric resistance on the occasion of a temperature rise of the lithium ion battery so that a remarkable rise of the battery temperature is prevented. This shutdown characteristic is an important characteristic for the separator of the lithium ion battery.

Generally, for the shutdown function of the separator, the operating principle is that microporous-membrane-shaped polyethylene melts and stops up porous of the separator. Because of that, for example, in a case of a separator which is consisting of polyethylene, the shutdown function operates approximately at 140° C. in the vicinity of the melting point of polyethylene.

Here, proposed is a separator of a lamination type such that, for the separator with the shutdown function working, which contracts by a remarkable rise of the battery temperature, the positive electrode and the negative electrode are not short-circuited (for example, see Japanese Patent Application Publication No. 2010-103050). For the separator of Japanese Patent Application Publication No. 2010-103050 being for a lithium ion battery, integrated with lamination are a base material, a nanofiber layer which is formed on this base material and includes heat-resistance-property polymer, and a low-melting-point nanofiber layer which is formed on this heat-resistance-property nanofiber layer.

FIG. 10 is for the separator of Japanese Patent Application Publication No. 2010-103050. As shown in FIG. 10, for the separator of Japanese Patent Application Publication No. 2010-103050, formed on the base material 30 is the heat-resistance-property nanofiber layer 32 the melting point of which is 180° C. or more, and formed on the heat-resistance-property nanofiber layer 32 is the low-melting-point nanofiber layer 31 the melting point of which is 80-120° C. The separator of Japanese Patent Application Publication No. 2010-103050 is a separator being for a lithium ion battery such that these laminated layers are fused with a heat press.

SUMMARY OF THE INVENTION

Problems to be Solved by the Invention

However, for a conventional separator as in Japanese Patent Application Publication No. 2010-103050, because plural layers are joined by a heat press, in the heat press step thereof the low-melting-point nanofiber layer 31 melts down and sometimes causes porus stopping up. If the low-melting-point nanofiber layer 31 is causing porus stopping up, then the impedance of the lithium ion battery becomes high before the shutdown function works, and there is a case where characteristics necessary for the lithium ion battery fail to come out.

The present invention furnishes, in consideration of the problems of the above-stated conventional separators, a separator for a nonaqueous electrolyte secondary battery, a nonaqueous electrolyte secondary battery utilizing the same, and manufacturing methods of the same, which are excellent in the heat-resistance-property, the electrolyte-liquid-retention-property and the impedance.

Means for Solving the Problem

In order to achieve the aforementioned objects,
the 1$^{st}$ aspect of the present invention is a separator for a nonaqueous electrolyte secondary battery, wherein the separator is formed by crossing plural nanosize fibers which contain two or more kinds of aqueous resins whose melting points are different.

Moreover, the $2^{nd}$ aspect of the present invention is a manufacturing method of a separator for a nonaqueous electrolyte secondary battery, wherein nanosize fibers are formed by utilizing a liquid solution, which contains a first aqueous resin and a second aqueous resin that has a melting point lower than a melting point of the first aqueous resin, by utilizing an electrospinning method, and the separator is produced by crossing the nanosize fibers.

Moreover, the $3^{rd}$ aspect of the present invention is a manufacturing method of a separator for a nonaqueous electrolyte secondary battery, wherein on an occasion when nanosize fibers are formed by utilizing a liquid solution, which contains a first aqueous resin, by utilizing an electrospinning method, and the separator is produced by crossing the nanosize fibers, after forming of the nanosize fibers, coating of all or part of surfaces of the nanosize fibers is carried out by a second aqueous resin which has a melting point lower than a melting point of the first aqueous resin.

Effects of the Invention

As in the above, by the present invention, able to be furnished are a separator for a nonaqueous electrolyte secondary battery, a nonaqueous electrolyte secondary battery utilizing the same, and manufacturing methods of the same, which not only have a shutdown function, but are excellent in the heat-resistance-property, the electrolyte-liquid-retention-property and the impedance.

MODES FOR IMPLEMENTING THE INVENTION

Figure 1A:
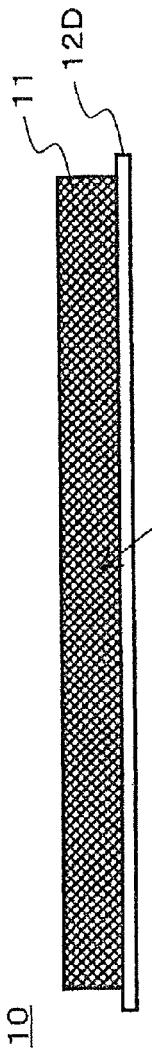
FIG. 1(a) is a figure which shows the configuration of the separator of the lithium ion battery of Embodiment 1 of the present invention.

In the following, regarding embodiments of the present invention, descriptions are given referring to the drawings.

Embodiment 1

In Embodiment 1, as an example of the separator for the nonaqueous electrolyte secondary battery of the present invention, descriptions are given regarding a separator of a lithium ion battery. Moreover, in Embodiment 1, as an example of the nonaqueous electrolyte secondary battery utilizing this separator, descriptions are given regarding the lithium ion battery. As the negative electrode material of the lithium ion battery, a carbon material, a compound or the like which is able to store and release lithium ions is utilized. As the positive electrode material of the lithium ion battery, $MeO_2$, $LiMeO_2$ (Me is a transition metal such as Co, Ni, Mn, Fe or the like) or the like is utilized. As the electrolyte liquid of the lithium ion battery, one such that $LiPF_6$, $LiCF_3SO_3$, $LiClO$, $LiBF_4$, or the like as an electrolyte is dissolved in an organic solvent (ethylene carbonate (Ethylene carbonate), propylene carbonate (Propylene carbonate), acetonitrile ($CH_3CN$), γ-butyrolactone (GBL), 1,2-dimethoxyethane ($C_4H_{10}O_2$), tetrahydrofuran (THF) or the like) is utilized. As the separator of the lithium ion battery, polyethylene (PE), polypropylene (PP), polyethylene terephthalate (PET), cellulose or the like is utilized.

Figure 1B:
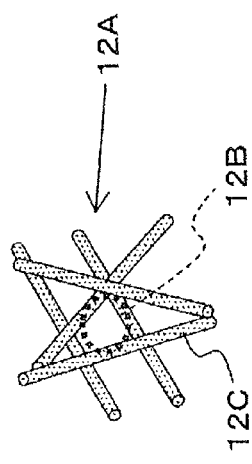
FIG. 1(b) is a figure which shows the fiber structure of the separator of Embodiment 1 of the present invention.
Figure 1C:
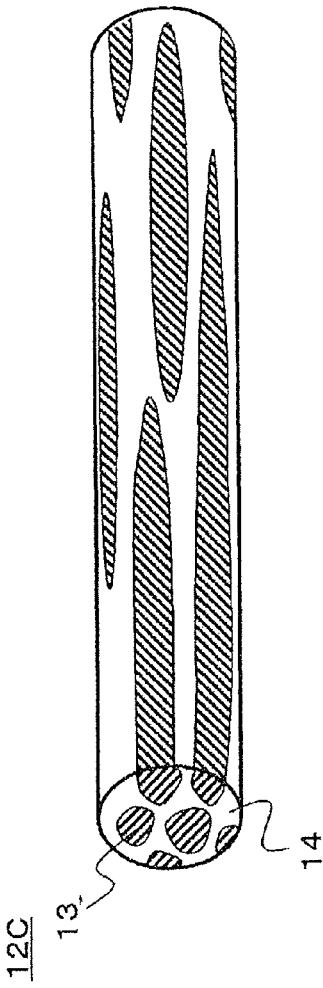
FIG. 1(c) is a partial enlarged figure which shows the composite nanofiber fiber of Embodiment 1 of the present invention.

FIGS. 1(a)-(c) are figures which show the configuration of the separator of the lithium ion battery of Embodiment 1 of the present invention. FIG. 1(a) is a figure which shows the configuration of the separator of the lithium ion battery of Embodiment 1 of the present invention, FIG. 1(b) is a figure which shows the fiber structure of the separator of Embodiment 1 of the present invention, and FIG. 1(c) is a figure which shows one fiber in the fiber structure of the separator of Embodiment 1 of the present invention.

The separator 10 of the lithium ion battery of present Embodiment 1 is characterized by being configured from the base material 12D and the composite nanofiber layer 11. The composite nanofiber layer 11 of present Embodiment 1 is configured from two or more kinds of resins with the melting points different (composite nanofiber fibers). Further, the composite nanofiber fibers which configure the composite nanofiber layer 11 of present Embodiment 1 are formed with two kinds of resins of the second aqueous resin (the aqueous low-melting-point resin) and the first aqueous resin (the aqueous high-melting-point resin) mixed. In Embodiment 1, the second aqueous resin is an aqueous low-melting-point resin, and the first aqueous resin is an aqueous high-melting-point resin. At this time, in Embodiment 1, by utilizing aqueous resins (the aqueous low-melting-point resin and the aqueous high-melting-point resin) for both of the materials, the composite nanofiber fibers are allowed to be easy to produce. As in Embodiment 1, by utilizing aqueous resins for both of the materials, compared with a case where a material of an organic solvent is used to produce the composite nanofiber fibers, the producing method thereof is facilitated.

In present Embodiment 1, for the second aqueous resin (the aqueous low-melting-point resin), an aqueous resin whose melting point is 80° C. or more and less than 180° C. is utilized. As the second aqueous resin (the aqueous low-melting-point resin), an ionomer (IO) of polyolefin system (polypropylene (PP), polyethylene (PE) or the like) is able to be utilized, for example. Moreover, in present Embodiment 1, the first aqueous resin (the aqueous high-melting-point resin) is an aqueous resin whose melting point is 180° C. or more. As the first aqueous resin (the aqueous high-melting-point resin), carboxymethyl cellulose (CMC), carboxymethyl cellulose ammonium (CMCA), methyl cellulose (MC), polyvinyl pyrrolidone (PVP), polyvinyl alcohol (PVA), ethylene-vinylalcohol copolymer (EVOH) or carboxyvinyl polymer (CVP) is able to be utilized, for example.

Additionally, because nanofiber fibrillization is performed on the occasion when the composite nanofiber fibers are produced, it is necessary that the first aqueous resin (the aqueous high-melting-point resin) of present Embodiment 1 be capable of being dissolved in water.

As described above, the aqueous high-melting-point resin is an example of the first aqueous resin of the present invention, and the aqueous low-melting-point resin is an example of the second aqueous resin of the present invention. That is to say, for the first aqueous resin, the melting point is higher compared with the second aqueous resin.

Moreover, in the present Embodiment 1, the composite nanofiber fiber which is formed with two kinds of resins of the second aqueous resin (the aqueous low-melting-point resin) and the first aqueous resin (the aqueous high-melting-point resin) mixed is an example of the nanosize fiber of the present invention, which contains two or more kinds of aqueous resins whose melting points are different.

Additionally, in the present description, the nanosize fiber is a fiber whose diam is 1 nm or more and 1000 nm or less.

The composite nanofiber layer 11 shown in FIG. 1(a) has, in the inner part thereof, the composite nanofiber fiber structure 12A shown in FIG. 1(b). As shown in FIG. 1(b), for the composite nanofiber fiber structure 12A, the structure is such that the respective composite nanofiber fibers 12C cross three-dimensionally. In FIG. 1(b), the reference numeral 12B shows the empty hole region of the composite nanofiber fiber structure 12A. One composite nanofiber fiber 12C of the fibers which configure the composite nanofiber fiber structure 12A is shown in FIG. 1(c).

As shown in FIG. 1(c), for the composite nanofiber fiber 12C of present Embodiment 1, the region of the second aqueous resin 13 and the region of the first aqueous resin 14 are mixed so as to be composite. In the composite nanofiber fiber 12C of Embodiment 1, as shown in FIG. 1(c), inside the region of the first aqueous resin 14, the second aqueous resin 13 is allowed to be shaped like islands and exists.

Here, to the composite nanofiber fiber 12C of present Embodiment 1, a shutdown temperature is set beforehand. The composite nanofiber fiber 12C of present Embodiment 1 is configured such that, at this shutdown temperature or more, the second aqueous resin 13 of the configuration members melts but the first aqueous resin 14 does not melt. Because the first aqueous resin 14 does not melt even at the shutdown temperature or more, also at the shutdown temperature or more the fiber structure is able to be retained.

The composite nanofiber layer 11 of present Embodiment 1 is configured by the composite nanofiber fibers 12C like this, at the shutdown temperature or more the melting of the second aqueous resin 13 is thereby generated while the structure of the first aqueous resin 14 with three-dimensional crossing shown in FIG. 1(b) is maintained, and the second aqueous resin 13 which is melting fills up the empty hole region 12B. And, the second aqueous resin 13 fills up the empty hole region 12B, so that the composite nanofiber layer 11 of present Embodiment 1 exerts the shutdown function. That is to say, with the first aqueous resin 14 shaped like fibers keeping the structure thereof, the second aqueous resin 13, from the contact points in between the composite nanofiber fibers 12C, melts down to fill up the void (the empty hole region 12B) between the composite nanofiber fibers 12C, so that the composite nanofiber layer 11 of present Embodiment 1 exerts the shutdown function.

Additionally, in the composite nanofiber fiber 12C, the composite state of the second aqueous resin 13 and the first aqueous resin 14 is able to be appropriately altered by the material compounding or the manufacturing method. For example, as the first aqueous resin 14, a resin without a melting point is also capable of being utilized.

As a separator of the lithium ion battery, in order to heighten the retention property of electrolyte liquid and decrease the impedance of the lithium ion battery as well, it is preferable that the composite nanofiber fiber be as thin as possible. In present Embodiment 1, as a producing method of the composite nanofiber fiber, the electrospinning method is utilized, capable of producing a fiber diameter in nanometer order. Utilizing the flowchart of FIG. 2, descriptions are given regarding the producing method of the separator of the lithium ion battery of present Embodiment 1.

Figure 2:
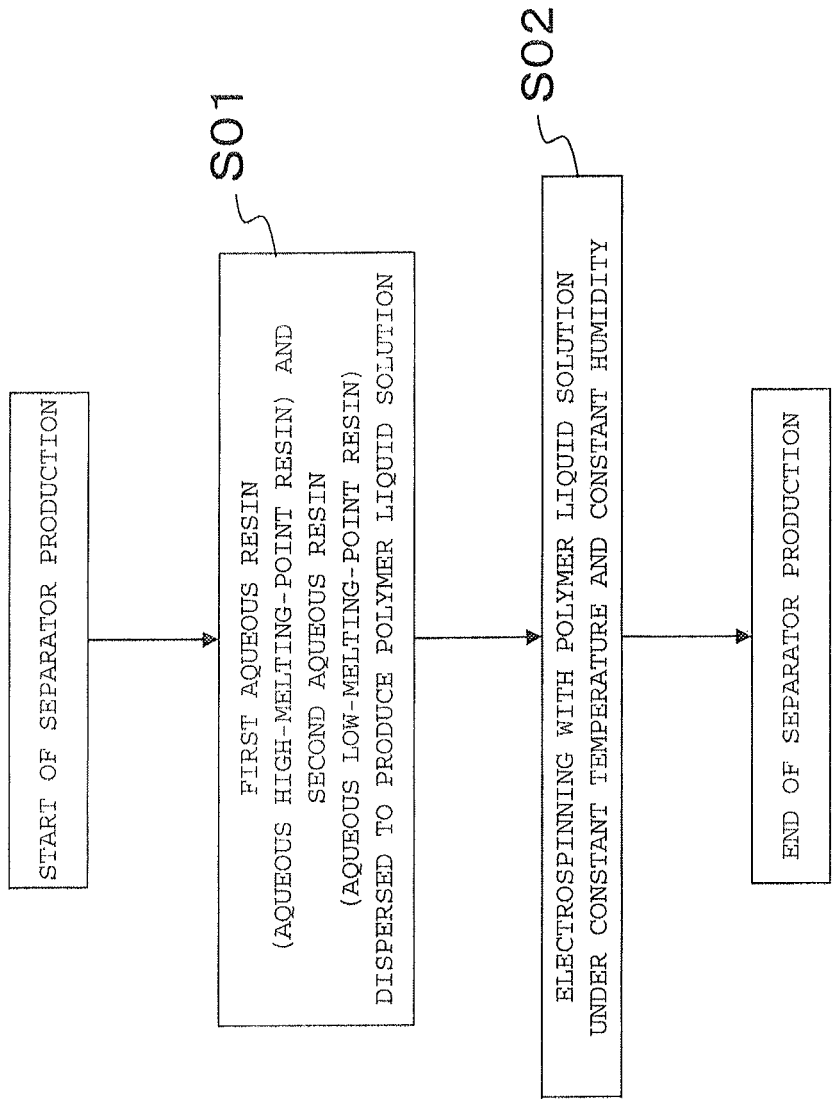
FIG. 2 is a flowchart of the manufacturing method of the separator of Embodiment 1 of the present invention.

In order to produce the separator of the lithium ion battery of present Embodiment 1, as shown in FIG. 2, to begin with, the second aqueous resin (the aqueous low-melting-point resin) 13 and the first aqueous resin (the aqueous high-melting-point resin) 14 are allowed to disperse in water, and a liquid solution is produced (Step S01). As a method of allowing the second aqueous resin 13 and the first aqueous resin 14 to disperse in water and producing the liquid solution, for example, there is a method of utilizing an agitator such as a planetary mixer, a homomixer, a pin mixer, a kneader, a homogenizer or the like. Additionally, these are capable of being used solely or alternatively, also in combination. It is preferable that, for the compounding proportion of the second aqueous resin 13 and the first aqueous resin 14 inside the liquid solution, the volume ratio of the second aqueous resin 13 be allowed to be in the range of 40% or more and 80% or less on such a premise that the volume of the total of the whole resin consisting of the second aqueous resin 13 and the first aqueous resin 14 is 100%. Regarding why this range is preferable, detailed descriptions will be given later. Additionally, at this time, the volume ratio of the first aqueous resin 14 becomes in the range of 20% or more and 60% or less.

Moreover, on the occasion when the second aqueous resin 13 and the first aqueous resin 14 are allowed to disperse in water, various inorganic particles, a dispersing agent, a surface-active agent, a crosslinking agent, a stabilizing agent or the like is also capable of being added together according to necessity. Moreover, in some cases, in order to allow each aqueous resin to be dissolved, heating of each aqueous resin with a hot bath may be performed. Moreover, in order to allow the heat-resistance-property of the separator to improve, inorganic minute particles which have a heat-resistance-property and an insulation property are also capable of being added to the aforementioned liquid solution. As this inorganic minute particle, for example, aluminum oxide (Alumina), silicon oxide (Silica), magnesium oxide, titanium oxide or zirconium oxide (Zirconia) is able to be utilized.

In present Embodiment 1, in order to allow the second aqueous resin 13 and the first aqueous resin 14 to disperse in water and produce the polymer liquid solution, agitation with a homomixer at 3000 rpm of 30 min has been performed.

Subsequently, by injecting, utilizing the electrospinning method, the liquid solution produced at Step S01 the fiber structure as shown in FIGS. 1(a)-(c) is formed (Step S02). The electrospinning method in present Embodiment 1 has been performed under the constant temperature and constant humidity with the air temperature of 23° C. and the humidity of 50% by injecting, while applying a high voltage of several tens of kV, the polymer liquid solution. In this way, in present Embodiment 1, by the composite nanofiber fibers formed with the electrospinning method utilized, the separator 10 is manufactured.

Figure 3:
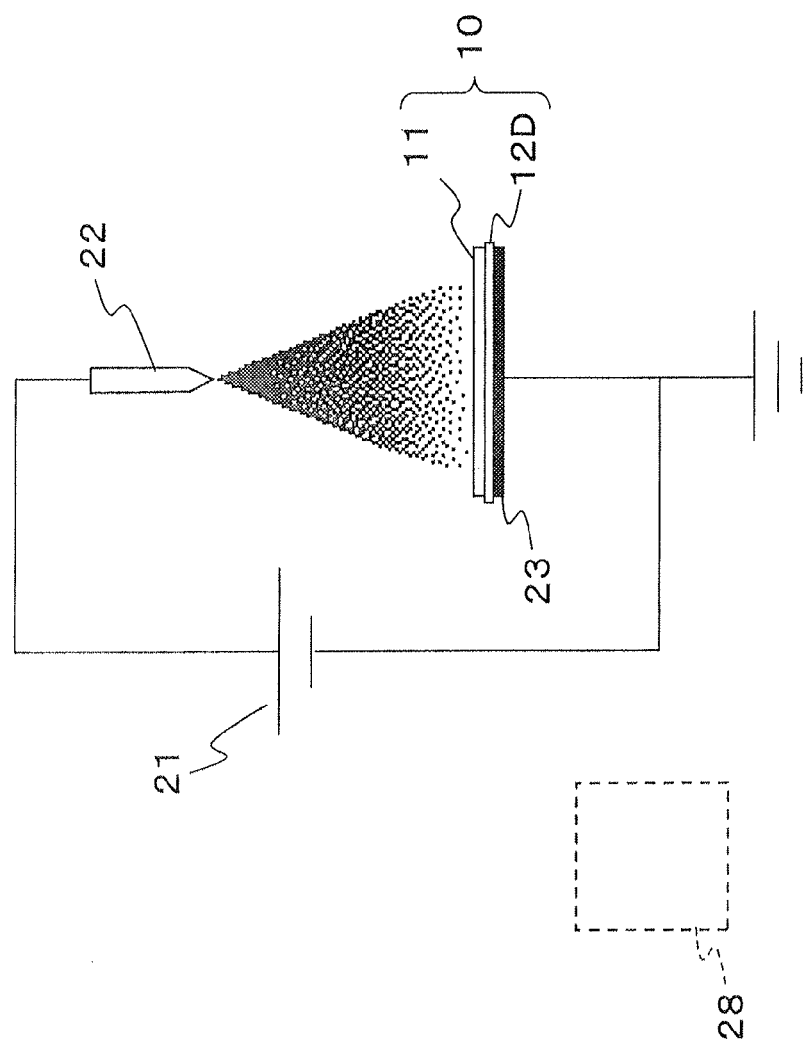
FIG. 3 is a figure which shows the scheme configuration of the manufacturing device of the separator of Embodiment 1 of the present invention.

The scheme configuration of the manufacturing device of the separator 10 of present Embodiment 1 utilizing the electrospinning method is shown in FIG. 3. This manufacturing device, by allowing the composite nanofiber fibers which have been formed with the electrospinning method utilized to deposit onto the base material 12D on the collector 23 as shown in FIG. 1(b), forms the composite nanofiber layer 11. By depositing the composite nanofiber layer 11 on the base material 12D, the separator 10 of the lithium ion battery is able to be manufactured. The composite nanofiber fibers of present Embodiment 1, as described above, are formed by applying a high voltage of several tens of kV to the polymer liquid solution. At this time, the voltage of several tens of kV is being applied, specifically, as shown in FIG. 3, between the spinning nozzle 22 and the collector 23 by the high voltage generator 21. Each action of this manufacturing device is controlled by the controlling device 28.

The polymer liquid solution passes through the inside of the spinning nozzle 22, to which a high voltage is applied by the high voltage generator 21, is released as the composite nanofiber fibers 12C, deposits onto the base material 12D on the collector 23 and becomes the composite nanofiber layer 11. In this way, by utilizing the electrospinning method of polymer liquid solution, a composite nanofiber fiber which has the size of several nm-several thousands nm is capable of being manufactured.

Additionally, to the separator of the lithium ion battery which is manufactured with the aforementioned electrospinning method utilized, a heat press, a crosslinking process, or the like may be added to the extent that there is no porus stopping up.

As the material of the second aqueous resin 13 in present Embodiment 1, as described above, an aqueous resin of low-melting-point and thermoplasticity is necessary which melts down at a desired shutdown temperature within the range of 80° C.-180° C. The inventors have performed, utilizing an ionomer of polyolefin system (polypropylene, polyethylene or the like) as the material of the second aqueous resin 13, manufacturing experiments of the separator with the particle diameter thereof allowed to be 0.1 μm or less.

Additionally, by experiments of the inventors, it has been found out that if as the second aqueous resin 13 particles with the particle diameter larger than 0.1 μm are utilized, then a composite nanofiber fiber is unable to be formed.

Moreover, by experiments of the inventors it has been found out that, with an ionomer alone, a composite nanofiber fiber is unable to be formed by the electrospinning method. Because of that, the inventors has, as in present Embodiment 1, by mixing the second aqueous resin 13 (the aqueous low-melting-point resin) which is an ionomer and the first aqueous resin 14 (the aqueous high-melting-point resin), allowed formation of a composite nanofiber fiber by the electrospinning method to be capable of being carried out.

Figure 4:
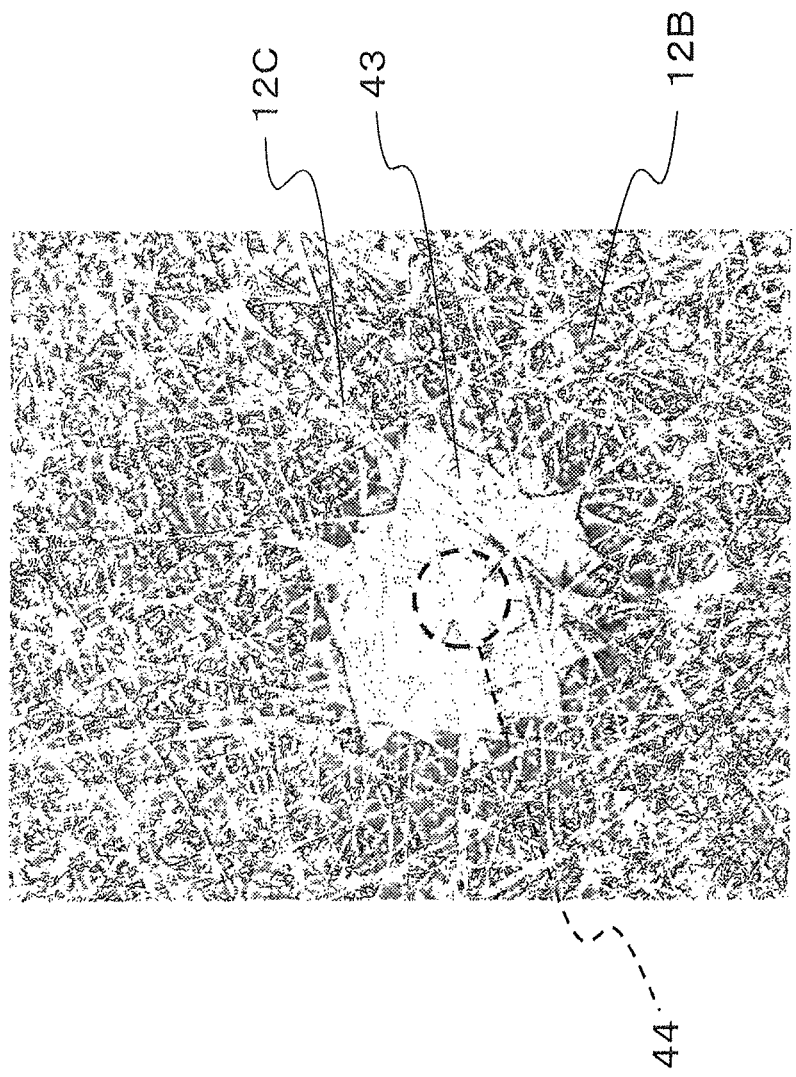
FIG. 4 is a photograph which shows a surface layer SEM image after heating of the separator of Example 1 in Embodiment 1 of the present invention.

FIG. 4 is a figure, which shows a surface layer SEM image after heating of the separator of Example 1 to be described later in Embodiment 1 of the present invention. FIG. 4 is a figure which shows the state where the shutdown temperature set beforehand has been, with respect to the separator, applied. As shown in FIG. 4, for the composite nanofiber layer 11 to which the shutdown temperature has been applied, with the structure of the first aqueous resin 14 being kept, from the contact points in between the fibers the second aqueous resin 13 melts down so that the empty hole region 12B which is a void between the fibers is covered, which shows a situation where porus stopping up is carried out. That is to say, the shutdown temperature of present Embodiment 1 is set so as to be higher than the melting point of the second aqueous resin 13, and be lower than the melting point of the first aqueous resin 14 as well.

In FIG. 4, the reference numeral 43 shows a portion where the second aqueous resin 13 (the aqueous low-melting-point resin) has melted down. Moreover, the reference numeral 44 shows the central part of the melting-down portion 43 enclosed with a broken line, and shows a heat generation spot. FIG. 4 is expressing a state where the surrounding portion whose radius is approximately three times as large as that of one heat generation spot 44 has melted down to be stopped up with respect thereto. Additionally, also in all the heat generation spots besides this, the second aqueous resin 13 around the heat generation spot 44 similarly melts down and carries out stopping up. If the temperature is allowed to further rise, then the regions which are stopped up by the second aqueous resin 13 become broad, the empty hole regions 126 of the composite nanofiber fiber structure 12A gradually reduce, and at the portions where the empty hole regions 12B have been stopped up the shutdown function is exerted. And, by the time the shutdown temperature is attained, all the empty hole regions are stopped up and the shutdown function is exerted.

That is to say, for the separator 10 of present Embodiment 1, in a case of utilization for a lithium ion battery, by a temperature rise on the occasion and the like when an abnormal electric current flows by erroneous connection of the positive electrode and the negative electrode, the empty hole regions 12B of the portions where the shutdown temperature has been reached are stopped up and, since exchanging of the ions inside the electrolyte liquid at the portions thereof is blocked and the ion resistance between the positive and negative electrodes increases, heat generation by a large electric current is able to be suppressed. Therefore, for the separator 10 of present Embodiment 1, in a case of utilization for a lithium ion battery, thermorunaway is able to be suppressed.

Additionally, in the aforementioned, descriptions have been given regarding examples in which, utilizing a polymer liquid solution such that the second aqueous resin 13 and the first aqueous resin 14 are allowed to disperse in water, by the electrospinning method, the composite nanofiber fibers 12C of the structure as shown in FIG. 1(c) are manufactured. Nevertheless, in case of structure such that the first aqueous resin 14 is able to retain the fiber structure when the shutdown temperature has been reached, even if composite nanofiber fibers of structure besides the structure of FIG. 1(c) are utilized, a similar shutdown function is able to be allowed to be exerted. Regarding another example in which the shutdown function is able to be allowed to be exerted, descriptions are given with FIGS. 5 and 6 utilized.

Figure 5:
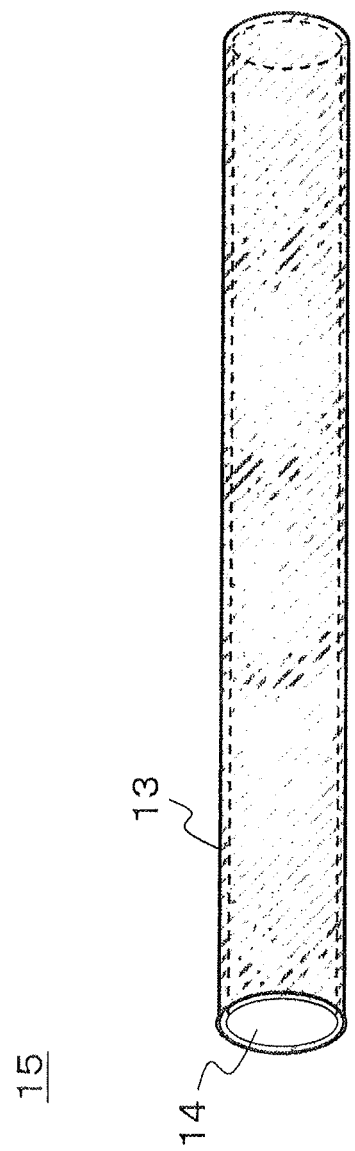
FIG. 5 is a partial enlarged figure which shows the composite nanofiber fiber of another configuration in Embodiment 1 of the present invention.

In FIG. 5, the composite nanofiber fiber 15 of another configuration which is able to allow the shutdown function to be exerted is shown. By forming the composite nanofiber layer 11, with the composite nanofiber fiber 15 shown in FIG. 5 utilized instead of the composite nanofiber fiber 12C shown in FIG. 1(c), effects similar to those of the above-described separator 10 are able to be exhibited.

The composite nanofiber fiber 15 of FIG. 5 is configured, coating, with the second aqueous resin 13, the nanosize fiber of the first aqueous resin 14. Specifically, by coating, with the second aqueous resin 13 of a prescribed volume ratio, the fiber of the first aqueous resin 14, the composite nanofiber fiber 15 which has a shutdown function similar to that of the composite nanofiber fiber 12C shown in FIG. 1(c) is produced.

Figure 6:
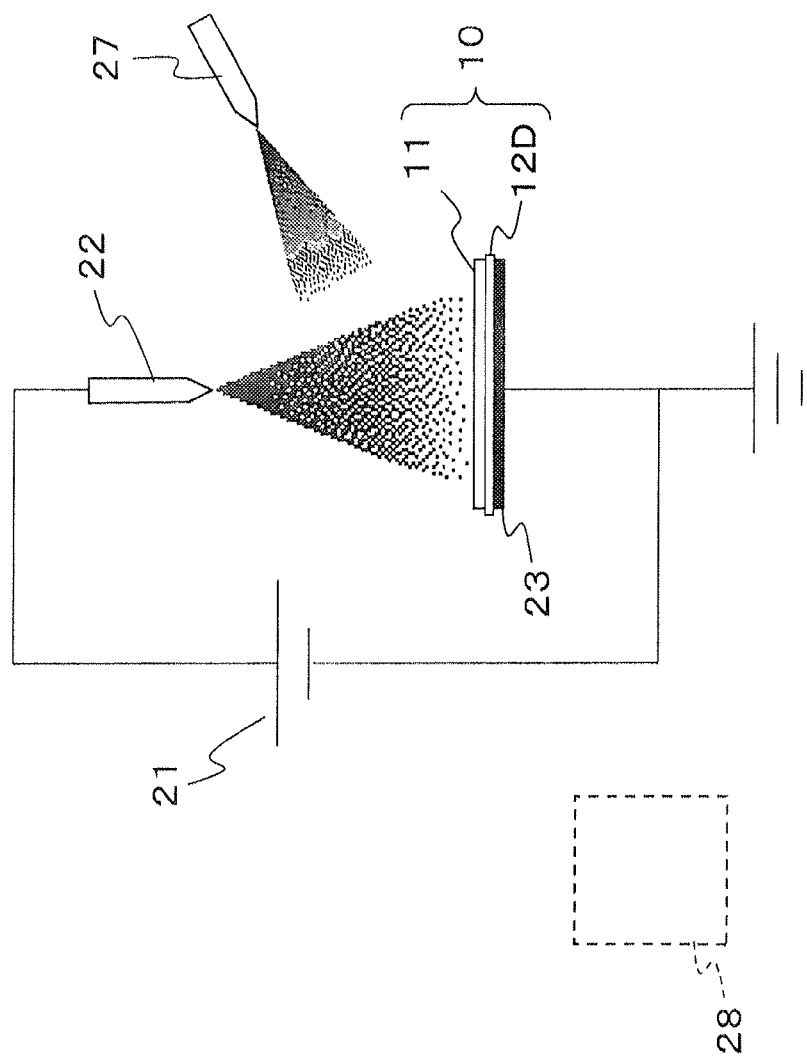
FIG. 6 is a figure which shows the scheme configuration of the manufacturing device of the separator of another configuration in Embodiment 1 of the present invention.

In FIG. 6, regarding the manufacturing device of the separator whose composite nanofiber layer 11 is configured with the composite nanofiber fibers 15 shown in FIG. 5, the scheme configuration thereof is shown. Each action of this manufacturing device is controlled by the controlling device 28.

In the manufacturing device of FIG. 6, while by the electrospinning method the fibers of the first aqueous resin 14 is allowed to be injected from the spinning nozzle 22, a liquid solution such that the second aqueous resin 13 is allowed to disperse in water is, from the side thereof, sprayed by the low-melting-point resin liquid solution injecting nozzle 27.

By means of this, on the base material 12D of the collector 23, the second aqueous resin 13 is deposited onto the fibers of the first aqueous resin 14 in a state where coating is carried out, and the composite nanofiber layer 11 is formed.

Moreover, by another manufacturing method, the composite nanofiber layer 11 which is configured with the composite nanofiber fibers 15 shown in FIG. 5 may be produced.

The composite nanofiber fibers 15 which have been coated with the second aqueous resin 13 are able to be manufactured, for example, by a method of spraying, with a liquid solution such that the second aqueous resin 13 is allowed to disperse in water, the fibers of the first aqueous resin 14 after producing by the electrospinning method the fibers of the first aqueous resin 14, or a method of soaking, in a liquid solution such that the second aqueous resin 13 is allowed to disperse in water, the fibers of the first aqueous resin 14 after producing by the electrospinning method the fibers of the first aqueous resin 14.

Additionally, for the composite nanofiber fiber shown in FIG. 5, coating of all the surface of the circumference of the fiber of the first aqueous resin 14 has been carried out with the second aqueous resin 13 but, in case the prescribed volume ratio (40% or more and 80% or less, described above) is ensured for the first aqueous resin 14 and the second aqueous resin 13, then spots of the circumference of the fiber of the first aqueous resin 14 where coating has not been carried out may be present.

Figure 7:
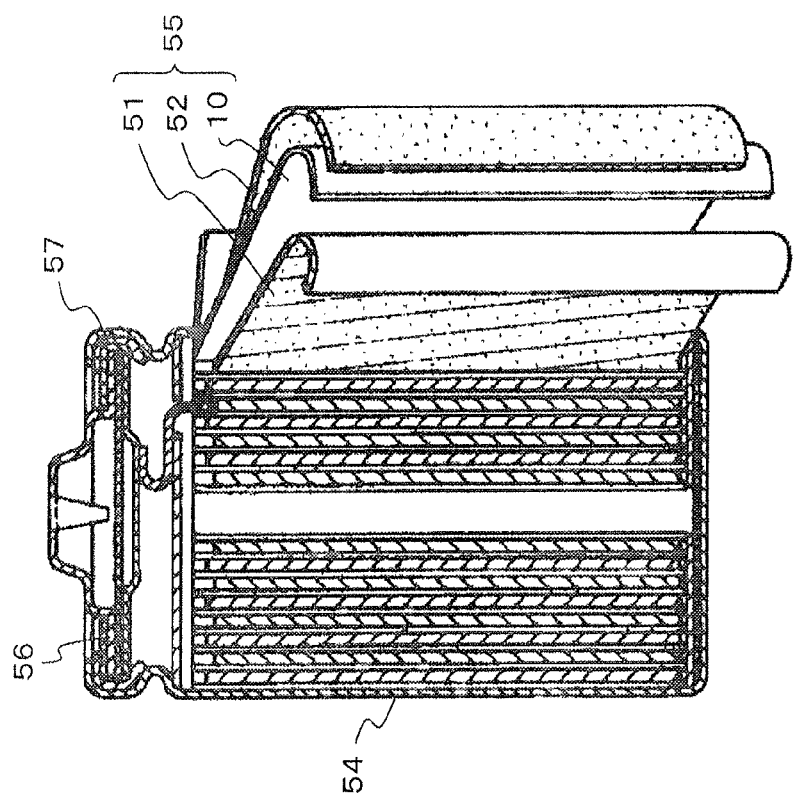
FIG. 7 is a longitudinal-section schematic figure of the lithium ion battery of Embodiment 1 of the present invention.

In FIG. 7, a longitudinal-section schematic figure of the lithium ion battery utilizing the separator 10 of present Embodiment 1 is shown.

For example, for the cylindrical lithium ion battery, the spirally shaped electrode plate group 55 is accommodated in the inner part of the bottomed cylindrical battery case 54 as shown in FIG. 7, after the electrolyte liquid consisting of a prescribed amount of a nonaqueous solvent is nextly infused into this battery case 54, the sealing plate 56 is inserted in the opening part of the battery case 54 and the opening part of the battery case 54 is bent in the inner direction so that assembling is carried out with sealing. Here, the spirally shaped electrode plate group 55 is one which has been formed with the positive electrode plate 51 and the negative electrode plate 52 wound, via the separator 10 of present Embodiment 1, in a spiral shape. Moreover, for the positive electrode plate 51 the active material is a composite lithium oxide, for the negative electrode plate 52 the active material is a material which can retain lithium, and for the sealing plate 56 the gasket 57 is attached to the periphery.

For the lithium ion battery utilizing the separator 10 of present Embodiment 1, on the occasion when an abnormal electric current flows by erroneous connection and the like of the positive electrode plate 51 and the negative electrode plate 52, by a temperature rise porus stopping up of pores of the separator 10 is carried out so that exchanging of the ions inside the electrolyte liquid is blocked and, since the ion resistance between the positive and negative electrodes increases, heat generation by a large electric current is able to be suppressed.

Additionally, the lithium ion battery shown in FIG. 7 is to be an example of the nonaqueous electrolyte secondary battery of the present invention, and the separator 10 is to be an example of the separator for the nonaqueous electrolyte secondary battery of the present invention. Moreover, the positive electrode plate 51 and negative electrode plate 52 are to be, respectively, examples of the positive electrode and negative electrode of the present invention.

Here, the smaller the average diam of the composite nanofiber fiber is, since the specific surface area of the fiber becomes large and the liquid retention ability of the electrolyte liquid becomes high, the lower the possibility that the electrolyte liquid locally reduces becomes. Considering these conditions, by experiments of the inventors it has been found out that, in present Embodiment 1, it is preferable that the diam of the composite nanofiber fiber be in the range of 1 nm or more and 1000 nm or less.

The separator of the lithium ion battery produced in present Embodiment 1 is one corresponding to a battery of a high output type. The objective initial impedance of the lithium ion battery is, for example, 0.5Ω or more and 10Ω or less and preferably 1Ω or more and 8Ω or less.

In present Embodiment 1, in order to produce a lithium ion battery excellent in the shutdown characteristic, it is defined that, for one such that, within the range of 80° C. or more and less than 180° C. for the shutdown temperature set beforehand, the impedance after 30 minutes heating is 3 times or more (for example, 3 times or more and 300 times or less) of the impedance before heating, the shutdown characteristic has been exerted and safety of the separator is able to be ensured. Additionally, it is good that the impedance after heating is preferably 10 times or more and 200 times or less, and further preferably 15 times or more and 150 times or less.

Additionally, in the evaluation of a separator of present Embodiment 1, a sample such that the impedance after 30 minutes heating at the shutdown temperature has risen to be 3 times or more is judged to be O since the shutdown characteristic has been exerted and safety of the separator is being able to be ensured, and a sample such that it is less than that is judged to be X since safety of the separator is being unable to be ensured.

In the following, regarding each Example by an experiment the inventors have performed, mention will be made. Additionally, in each Example, the Gurley value (the air permeability) is taken to be the air resistance of the composite nanofiber fiber layer, and the evaluation has been carried out with measurement in accordance with JIS P8117.

Example 1

Example 1 is one such that, in order to produce composite nanofiber fibers by the electrospinning method, as the second aqueous resin 13 an aqueous polyethylene ionomer of minute particle of the particle diameter 0.06 μm or less is utilized, and as the first aqueous resin 14 a liquid such that polyvinyl alcohol is allowed to disperse in water is utilized. In Example 1, a liquid solution such that the second aqueous resin (polyethylene) and the first aqueous resin (polyvinyl alcohol) have been mixed with a homomixer (the volume solid rate of the mixing liquid is 10%) is produced, and this liquid solution is utilized as the formulated liquid of the electrospinning. And, in Example 1 the compounding is allowed to be such that, on such a premise that the total volume of the whole resin of the second aqueous resin (polyethylene) and the first aqueous resin (polyvinyl alcohol) is 100%, the volume ratio of the second aqueous resin (the aqueous low-melting-point resin) becomes 40%. By allowing the liquid solution produced in this way to melt at an ordinary temperature and carrying out the electrospinning, a separator of 5 g/m² has been produced.

Example 2

In Example 2, a separator has been produced similarly to Example 1, except that the volume ratio of the second aqueous resin (the aqueous low-melting-point resin) is allowed to be 50%.

Example 3

In Example 3, a separator has been produced similarly to Example 1, except that the volume ratio of the second aqueous resin (the aqueous low-melting-point resin) is allowed to be 60%.

Example 4

In Example 4, a separator has been produced similarly to Example 1, except that the volume ratio of the second aqueous resin (the aqueous low-melting-point resin) is allowed to be 80%.

Comparative Example 1

In Comparative Example 1, as the first aqueous resin (the aqueous high-melting-point resin) polyamide 9T is used, and as the second aqueous resin (the aqueous low-melting-point resin) ethylene-vinylalcohol copolymer is utilized. For the polyamide 9T here, the dicarboxylic acid component is composed of 100 mol % of terephthalic acid, and the diamine component is composed of 50 mol % of 1,9-nonanediamine and 50 mol % of 2-methyl-1,8-octanediamine. And, these resins are laminated in order with the electrospinning method utilized, a heat press process of the lamination body thereof is performed at 170° C., and a separator has been produced. In the lamination body of Comparative Example 1, 1.1 g/m² of a membrane of the first aqueous resin (a membrane of the aqueous high-melting-point resin) has been produced, and 3.4 g/m² of a membrane of the second aqueous resin (a membrane of the aqueous low-melting-point resin) has been produced.

Comparative Example 2

In Comparative Example 2, a separator has been produced similarly to Example 1, except that the volume ratio of the second aqueous resin (the aqueous low-melting-point resin) is allowed to be 30%.

Comparative Example 3

In Comparative Example 3, a separator has been produced similarly to Example 1, except that the volume ratio of the second aqueous resin (the aqueous low-melting-point resin) is allowed to be 90%.

The separator which has been manufactured in each Example aforementioned, or each Comparative Example aforementioned is sandwiched between the positive electrode plate and the negative electrode plate and, after this is immersed in 1 mol of LiPF6/EC:EMC (1:3) liquid solution and the electrolyte liquid is poured, a lithium ion battery manufactured by carrying out vacuum sealing with an aluminum laminate film is utilized, so that the experiments are performed. Electric discharge measurement is performed with electric currents of 0.2C and 2C with respect to the rated cell capacity (1C) and, as the capacity maintenance rate, the fraction of capacity of 2C with respect to 0.2C has been evaluated. Generally, it is desirable that the capacity maintenance rate be, as a characteristic such that the capacity does not reduce even if a high electric current is allowed to flow, 95% or more.

In each Example aforementioned, or each Comparative Example aforementioned, used as the positive electrode plate is one such that a paint which is configured from PVdF binder, carbon black, and LiCoO₂ has been cast on the aluminum foil. Moreover, used as the negative electrode plate is one such that a paint which is configured from black lead, CMC (carboxymethyl cellulose), and SBR (styrene-butadiene rubber) has been cast on the copper foil.

Additionally, the positive electrode plate and the negative electrode plate which are included in the lithium ion battery in the present invention are never limited to ones which have configurations as in the aforementioned. For example, using a positive electrode plate and a negative electrode plate that are disclosed to a person who has ordinary knowledge in the field of the art to which the present invention pertains, a lithium ion battery in the present invention is able to be configured.

The respective results are shown in Table 1, where the fiber diameter and the volume ratio of resin are changed in each Example aforementioned, or each Comparative Example aforementioned. Additionally, in Table 1, the item with "-" is an item such that no unit exists, or an item such that measurement is unable to be carried out.

TABLE 1

| | Fiber Diameter (nm) | Second Aqueous Resin:First Aqueous Resin (Aqueous Low-Melting-Point Resin: Aqueous High-Melting-Point Resin) Volume Ratio | Gurley Value (sec/100 cc) | Membrane Formation | Shutdown | Capacity Maintenance Rate 2 C/0.2 C |
|---|---|---|---|---|---|---|
| Example 1 | 400 | 40:60 | 11 | ○ | ○ | 95% |
| Example 2 | 370 | 50:50 | 10 | ○ | ○ | 95% |

TABLE 1-continued

| | Fiber Diameter (nm) | Second Aqueous Resin:First Aqueous Resin (Aqueous Low-Melting-Point Resin: Aqueous High-Melting-Point Resin) Volume Ratio | Gurley Value (sec/100 cc) | Membrane Formation | Shutdown | Capacity Maintenance Rate 2 C/0.2 C |
|---|---|---|---|---|---|---|
| Example 3 | 280 | 60:40 | 8 | ○ | ○ | 96% |
| Example 4 | 250 | 80:20 | 7 | ○ | ○ | 96% |
| Comparative Example 1 (lamination body) | 200, 100 | 75:25 | 54 | ○ | ○ | 89% |
| Comparative Example 2 | 580 | 30:70 | 13 | ○ | X | 95% |
| Comparative Example 3 | — | 90:10 | — | X | — | — |

(Evaluation of Gurley Value (Air Permeability))

As the Gurley value of the separator, from the viewpoint that the ions move inside the separator, it is preferable that a lower value be possessed. In present Embodiment 1, since it is defined that one with the Gurley value of 15 or less is preferable, except for Comparative Example 1, the rest are preferable ones for the Gurley value.

(Evaluation of Capacity Maintenance Rate)

For Examples 1-4 and Comparative Example 2, the capacity maintenance rate of 95% or more is achieved. On the other hand, for Comparative Example 1 which has lamination structure, the capacity maintenance rate is less than 95%. Because of that, it is thought that for Comparative Example 1 the battery characteristic has become bad. The inventors presume that, in a separator of a lamination type as in Comparative Example 1, porus stopping up is generated by a heat press before the shutdown function is exerted so that the battery characteristic has become worse.

(Evaluation of Mixing Ratio)

As in Comparative Example 3, the electrospinning has been performed under the condition where the volume ratio of the second aqueous resin (the aqueous low-melting-point resin) is 90%, then the membrane formation is unable to be carried out. In contrast to that, as in Example 4, the electrospinning has been performed under the condition where the volume ratio of the second aqueous resin (the aqueous low-melting-point resin) is 80%, then the membrane formation is able to be carried out. Therefore, it has been found out that it is preferable that the volume ratio of the second aqueous resin (the aqueous low-melting-point resin) be 80% or less.

Moreover, as in Comparative Example 2, the electrospinning has been performed under the condition where the volume ratio of the second aqueous resin (the aqueous low-melting-point resin) is 30%, then the membrane formation is able to be carried out, but the shutdown function has not been exerted. In contrast to that, as in Example 1, the electrospinning has been performed under the condition where the volume ratio of the second aqueous resin (the aqueous low-melting-point resin) is 40%, then the shutdown function has been exerted. Therefore, it has been found out that it is preferable that the volume ratio of the second aqueous resin (the aqueous low-melting-point resin) be 40% or more.

As in the above, by experiments of the inventors it has been found out that, by allowing the volume ratio of the second aqueous resin (the aqueous low-melting-point resin) to be 40% or more and 80% or less, able to be furnished is a separator such that the air-permeability-property is good and the shutdown function is satisfactory as compared with a conventional one.

Further, in the separator, in order to surely fill up the empty hole regions of the composite nanofiber fiber structure, it is more preferable that the volume ratio of the second aqueous resin (the aqueous low-melting-point resin) be allowed to be 50% or more.

Additionally, in present Embodiment 1, a composite nanofiber fiber whose fiber diameter after the electrospinning is 1 nm or more and 1000 nm or less is able to be obtained. By utilizing a separator with this composite nanofiber fiber utilized, which is combined with a positive electrode plate, a negative electrode plate and an electrolyte liquid, a lithium ion battery excellent in the aspects of the safety and battery characteristic is able to be furnished.

Moreover, the melting points of the second aqueous resin 13 and first aqueous resin 14 described in the aforementioned are examples, and would be determined corresponding to the shutdown temperature to be set, the product and the like, and resins which have the determined melting points would be appropriately combined.

Moreover, in the aforementioned, composite nanofiber fibers which contain two kinds of resins of the second aqueous resin (the aqueous low-melting-point resin) and the first aqueous resin (the aqueous high-melting-point resin) are allowed to be utilized but, even if composite nanofiber fibers which contain three or more kinds of resins are utilized, similar effects are able to be obtained.

By a combination of three or more kinds of resins with the melting points different, further effects are able to be obtained, compared with the case of two kinds of resins. A case will be described where, for example, in a composite nanofiber fiber which is allowed to contain three kinds of resins that have different melting points, these three kinds of resins are allowed to be a low-melting-point resin, a medium-melting-point resin and a high-melting-point resin respectively. Here, the case will be described where the low-melting-point resin is allowed to be the aforementioned second aqueous resin 13, the high-melting-point resin is allowed to be the aforementioned first aqueous resin 14, utilized as the medium-melting-point resin is one such that the melting point is low by 10% in degrees centigrade compared with the first aqueous resin 14, and the high-melting-point resin is allowed to be the core material of the fiber. In this case, the aforementioned shutdown function is exerted at the stage where the temperature rise to the melting point of the second aqueous resin 13 is carried out in a region of a part of the separator but, at this stage, only the exchanging of the ions in that region is stopping, and the electric power supply function as a lithium ion battery is not stopping. But, if the temperature further rises and reaches the melting point of the first aqueous resin 14, because the high-melting-point resin melts and the separator contracts, then the positive electrode plate and the negative electrode plate are finally short-circuited, and the electric power supply function completely stops. By utilizing three kinds of resins which have different melting points, this is detected in advance, and alarm display and the like are able to be performed at the stage before this short-circuit. That is to say, before the temperature rises and reaches the high melting point, by sensing at the stage of the medium melting point an increase of the resistance by the medium-melting-point resin melting and allowing the alarm display to be carried out, a deterioration manner of the lithium ion battery is able to be grasped in advance.

Moreover, also in a case where a composite nanofiber fiber is allowed to contain, as three kinds of resins, two kinds of resins of a low melting point such that the melting points are the same but they have different characteristics, and one kind of resin of a high melting point, further effects are obtained. In this case, by utilizing as the one of the resins of a low melting point the aforementioned second aqueous resin, and utilizing as the other of the resins of a low melting point one whose strength is high, the strength of the separator after a shutdown is able to be allowed to improve more.

Embodiment 2

In Embodiment 1, by utilizing the composite nanofiber layer 11 whose configuration is allowed to be such that composite nanofiber fibers of a single kind are allowed to cross each other, realized is a separator such that the air-permeability-property is good and the shutdown function is satisfactory as compared with a conventional one. Nevertheless, even if, as in Embodiment 2 of the present invention, a configuration such that nanofiber fibers of a different kind are further crossed is utilized as the composite nanofiber layer 11, similar effects are obtained.

Embodiment 2 of the present invention is characterized in that, for the composite nanofiber layer 11, instead of allowing the configuration to be such that composite nanofiber fibers of a single kind are crossed in Embodiment 1, the configuration is allowed to be such that nanofiber fibers of plural kinds are crossed.

Figure 8:
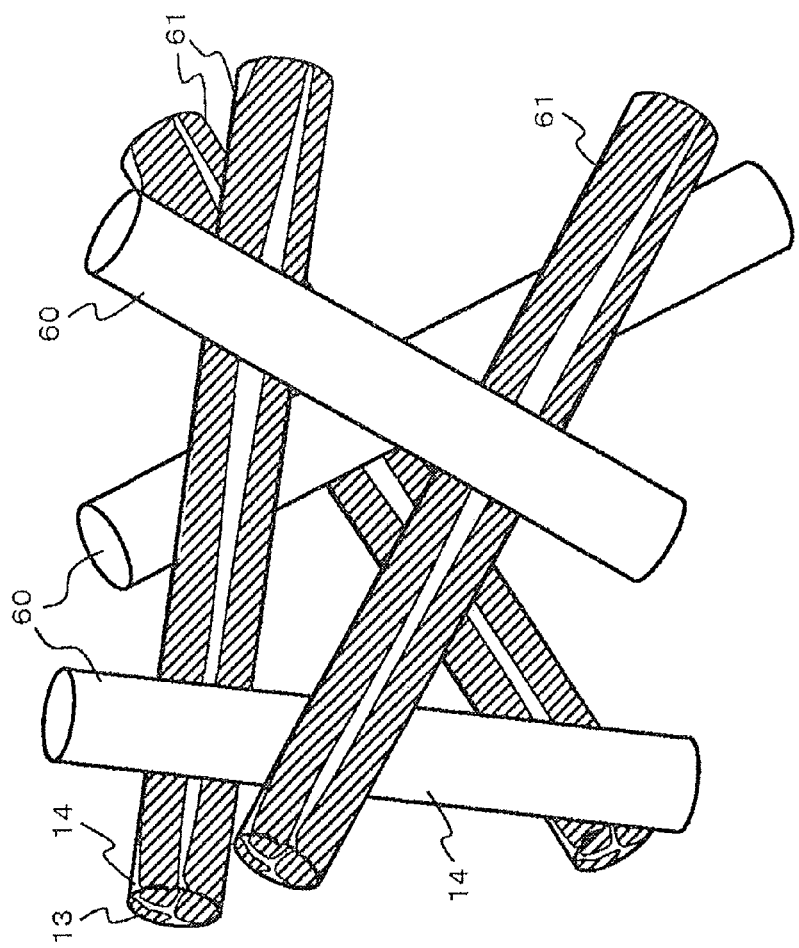
FIG. 8 is a figure which shows the fiber structure of the separator of the lithium ion battery of Embodiment 2 of the present invention.

FIG. 8 is a figure which shows the fiber structure of the separator of Embodiment 2 of the present invention.

The composite nanofiber layer 11 of present Embodiment 2 has, as shown in FIG. 8, a configuration such that the first nanofiber fibers 60 and the second nanofiber fibers 61 cross each other.

The first nanofiber fiber 60 is a nanofiber fiber which is formed by the first aqueous resin 14.

The second nanofiber fiber 61 is a composite nanofiber fiber such that the second aqueous resin 13 and the first aqueous resin 14 are mixed so as to be composite. Moreover, the second nanofiber fiber 61 is a nanofiber fiber rich in low-melting-point resin, such that the containing amount of the second aqueous resin 13 is large compared with the first aqueous resin 14. Here, in present Embodiment 2, a nanofiber fiber of a high melting point and a nanofiber fiber of a low melting point are not utilized, and a nanofiber fiber of a high melting point and a composite nanofiber fiber rich in low-melting-point resin are utilized, because a nanofiber fiber of a low melting point is difficult to form as a fiber. Because of that, in present Embodiment 2, as a fiber of a low melting point, a composite nanofiber fiber rich in low-melting-point resin is used.

Additionally, the second nanofiber fiber 61 is to be an example of the composite nanofiber fiber which contain two or more kinds of the aqueous resins of the present invention, whose melting points are different.

In present Embodiment 2, at the shutdown temperature set beforehand or more, the second aqueous resin 13 melts and the fiber structure of the second nanofiber fibers 61 is not retained but, because the first aqueous resin 14 does not melt, the fiber structure of the first nanofiber fibers 60 is retained. That is to say, setting is carried out so that, even at the shutdown temperature or more, the fiber structure by the first nanofiber fibers 60 is retained.

By having carried out the setting like this, while the first nanofiber fibers 60 maintain the fiber structure with three-dimensional crossing, the second aqueous resin 13 of the second nanofiber fibers 61 which is melting fills up the empty hole regions of the in-between spaces where the first nanofiber fibers 60 cross. The second aqueous resin 13 fills up the empty hole regions, so that the shutdown function is able to be allowed to be exerted.

Additionally, in order to maintain the fiber structure of the composite nanofiber layer 11 even in a state where the second aqueous resin 13 is melting, it is necessary that the first nanofiber fibers 60 be crossed under prescribed condition.

The first nanofiber fibers 60 are, for example, utilizing a liquid solution such that the first aqueous resin 14 is allowed to disperse in water, able to be produced by the electrospinning method.

The second nanofiber fibers 61 are, utilizing a liquid solution such that the second aqueous resin 13 and the first aqueous resin 14 are allowed to disperse in water, able to be produced by the electrospinning method.

Figure 9:
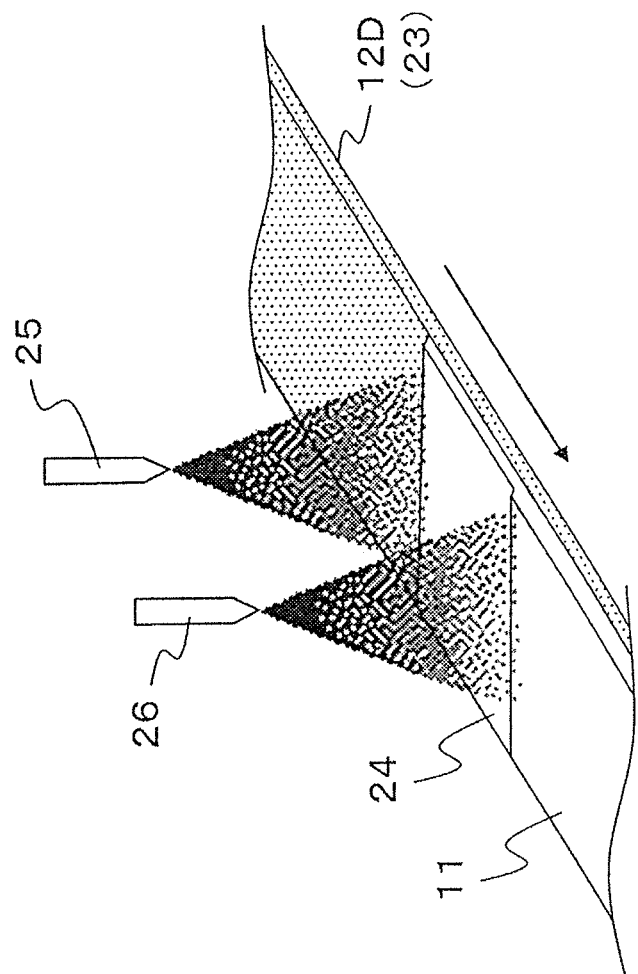
FIG. 9 is a figure which describes the manufacturing method of the separator of Embodiment 2 of the present invention.
Figure 10:
FIG. 10 is a figure which shows the conceptual configuration of the conventional separator of the lithium ion battery mentioned in Japanese Patent Application Publication No. 2010-103050.

In FIG. 9, a figure which describes the manufacturing method of the separator of present Embodiment 2 is shown.

In the manufacturing device of the separator of present Embodiment 2, on the upstream-side above the collector 23 which is conveyed, the first spinning nozzle 25 is arranged which injects a liquid solution such that the first aqueous resin 14 is allowed to disperse in water and, on the downstream-side, the second spinning nozzle 26 is arranged which injects a liquid solution such that the second aqueous resin 13 and the first aqueous resin 14 are allowed to disperse in water.

From above the base material 12D on the collector 23 which is conveyed in the arrow direction in the figure, the respective liquid solutions are injected by the first spinning nozzle 25 and the second spinning nozzle 26, and the composite nanofiber layer 11 is gradually formed on the collector 23. Specifically, on the occasion of having passed through the first spinning nozzle 25, the nanofiber fiber membrane 24 by the first nanofiber fibers 60 is formed onto the base material 12D on the collector 23, on the occasion of passing through the second spinning nozzle 26, the nanofiber fiber membrane by the second nanofiber fibers 61 is formed in such a way that it crosses the nanofiber fiber membrane 24 which has been formed with the first nanofiber fibers 60 and, as a result, the composite nanofiber layer 11 is formed.

Additionally, with the electrospinning method, nanofiber fibers that are formed only with the second aqueous resin 13 are unable to be produced but, by a method except the electrospinning method, nanofiber fibers that have been formed only with the second aqueous resin 13 are produced, which nanofiber fibers instead of the second nanofiber fibers 61 may be allowed to cross the first nanofiber fibers 60. Also in this case, able to be obtained are effects similar to those for the composite nanofiber layer 11 with the first nanofiber fibers 60 and the second nanofiber fibers 61 being crossed.

Additionally, in each Embodiment, descriptions have been given regarding the lithium ion battery as an example of the nonaqueous electrolyte secondary battery of the present invention, but it goes without saying that the configuration of the separator for the lithium ion battery which has been described in each Embodiment is able to be applied as the separator for another nonaqueous electrolyte secondary battery. For example, the present invention is able to be applied also to a nonaqueous electrolyte secondary battery making use of Mg ions, Na ions or the like.

INDUSTRIAL APPLICABILITY

A separator for a nonaqueous electrolyte secondary battery of the present invention is, since safety is high, and the battery performance on the occasion of use for a battery also improves, useful for a separator for a battery of a nonaqueous electrolyte secondary battery on the whole.

DESCRIPTION OF THE REFERENCE NUMERALS 10 separator
11 composite nanofiber layer
12A composite nanofiber fiber structure
12B empty hole region
12C, 15 composite nanofiber fiber
12D, 30 base material
13 second aqueous resin
14 first aqueous resin
21 high voltage generator
22 spinning nozzle
23 collector
24 nanofiber fiber membrane
25 first spinning nozzle
26 second spinning nozzle
27 low-melting-point resin liquid solution injecting nozzle
28 controlling device
31 low-melting-point nanofiber layer
32 heat-resistance-property nanofiber layer
43 melting-down portion
44 heat generation spot
51 positive electrode plate
52 negative electrode plate
54 battery case
55 electrode plate group
56 sealing plate
57 gasket
60 first nanofiber fiber
61 second nanofiber fiber

The invention claimed is:

1. A separator for a nonaqueous electrolyte secondary battery, wherein
the separator has a configuration such that first nanosize fibers and second nanosize fibers cross each other,
the first nanosize fibers only contain a first aqueous resin and has a structure with a three-dimensional crossing,
the second nanosize fibers contain the first aqueous resin and a second aqueous resin that has a melting point lower than a melting point of the first aqueous resin, and
the second aqueous resin is a resin which melts at a shutdown temperature of the separator or more, and the first aqueous resin is a resin which retains fiber structure even at the shutdown temperature or more.

2. The separator for a nonaqueous electrolyte secondary battery according to claim 1, wherein
the nanosize fiber is configured such that the second aqueous resin is shaped like islands to be distributed within the first aqueous resin.

3. The separator for a nonaqueous electrolyte secondary battery according to claim 1, wherein
the second nanosize fiber is configured such that all or part of a surface of the first aqueous resin is coated with the second aqueous resin.

4. The separator for a nonaqueous electrolyte secondary battery according to claim 1, wherein
a volume ratio of the second aqueous resin is 40% or more and 80% or less on such a premise that total volume of the first aqueous resin and the second aqueous resin is 100%.

5. The separator for a nonaqueous electrolyte secondary battery according to claim 4, wherein
the volume ratio of the second aqueous resin is 50% or more.

6. A nonaqueous electrolyte secondary battery, comprising:
a separator for a nonaqueous electrolyte secondary battery according to claim 1;
a positive electrode; and
a negative electrode.

7. A manufacturing method of a separator for a nonaqueous electrolyte secondary battery, wherein
nanosize fibers are formed by utilizing a liquid solution, which contains a first aqueous resin and a second aqueous resin that has a melting point lower than a melting point of the first aqueous resin, by utilizing an electrospinning method, and the separator is produced by crossing the nanosize fibers.

8. A manufacturing method of a nonaqueous electrolyte secondary battery, wherein
a separator for a nonaqueous electrolyte secondary battery which is manufactured with the manufacturing method according to claim 7, a positive electrode and a negative electrode are combined so that the nonaqueous electrolyte secondary battery is manufactured.

* * * * *